United States Patent [19]

Simpson et al.

[11] Patent Number: 5,855,392
[45] Date of Patent: Jan. 5, 1999

[54] AIR BAG COVER AND MEMBRANE HORN SWITCH ASSEMBLY

[75] Inventors: James Jeffrey Simpson, Fairborn; Chi Thi Ha, Dayton; Paul Marion Landis, Englewood; Duane David Williams, Beavercreek, all of Ohio

[73] Assignee: General Motors Corporation, Detroit, Mich.

[21] Appl. No.: 741,094

[22] Filed: Oct. 30, 1996

[51] Int. Cl.$^6$ .................................................. B60R 21/22
[52] U.S. Cl. ..................... 280/731; 200/61.54; 280/728.3
[58] Field of Search ............................. 280/728.1, 728.3, 280/731; 200/61.54, 61.55

[56] References Cited

U.S. PATENT DOCUMENTS

| | | |
|---|---|---|
| 4,934,735 | 6/1990 | Embach . |
| 5,002,306 | 3/1991 | Hiramitsu et al. . |
| 5,338,059 | 8/1994 | Inoue et al. . |
| 5,369,232 | 11/1994 | Leonelli . |
| 5,484,561 | 1/1996 | Weber et al. . |
| 5,499,841 | 3/1996 | Trojan ..................................... 280/731 |
| 5,569,893 | 10/1996 | Seymour ............................... 200/61.54 |
| 5,577,767 | 11/1996 | Nemoto ................................. 200/61.54 |

OTHER PUBLICATIONS

U.S. application Ser. No. 08/636,857, Schenck, filed Apr. 23, 1996.

*Primary Examiner*—Eric D. Culbreth
*Attorney, Agent, or Firm*—Kathryn A. Marra

[57] ABSTRACT

An air bag module and membrane horn switch assembly includes an air bag cover, a membrane horn switch, a backing plate fixedly mounted on the cover in spaced relation to the cover, and a switch containment portion disposed on the backing plate. The switch containment portion releasably captures the membrane horn switch within the switch containment portion such that the membrane horn switch is normally positioned in spaced relation to the cover and such that the membrane horn switch is activated by downward movement of the cover towards the membrane horn switch. In addition, the switch containment portion also permits release and removal of the membrane horn switch from the switch containment portion while the backing plate remains fixed to the cover. Advantageously, the membrane horn switch can be removed and replaced while the cover and the backing plate remain stationary and undamaged.

20 Claims, 3 Drawing Sheets

AIR BAG COVER AND MEMBRANE HORN SWITCH ASSEMBLY

This invention relates generally to an air bag cover and membrane horn switch assembly having a serviceable membrane horn switch.

BACKGROUND OF THE INVENTION

It is well known in motor vehicles to provide an air bag module mounted to a steering wheel. The air bag module typically includes an inflator for generating gas to inflate an air bag for restraining an occupant. The air bag module also typically includes an air bag cover which houses the air bag and inflator. The cover includes weakened portions which break open upon air bag deployment.

It is known to provide an air bag cover molded of a resilient plastic material. It is also known to mount membrane horn switches on a backing plate which is mounted in spaced relation to the cover. These membrane horn switches conventionally comprise two very thin sheets having conductive coatings which are normally separated by thin spacers. Pressure on the switch presses the conductive surfaces together to close a circuit and actuate a horn. Typical membrane horn switches are less than one millimeter in thickness. To actuate the horn, the driver must sufficiently compress the cover directly above the switch to apply pressure to the membrane horn switch for actuating the horn.

In the prior art, the backing plate is typically planar and the membrane horn switch is fixedly mounted to the backing plate, such as by an adhesive. Alternately, the backing plate and the membrane horn switch may each have aligned apertures through which plastic offset posts of the cover extend to fixedly fasten both the backing plate and the membrane horn switch to the cover, such as by heat staking or other bonding processes. Once the membrane horn switch and backing plate are attached to the cover, the membrane horn switch cannot be removed for servicing without damaging of the backing plate, cover and membrane horn switch. Thus, an entire new cover and backing plate are also required each time the membrane horn switch is serviced.

SUMMARY OF THE INVENTION

The present invention provides advantages and alternatives over the prior art by providing an air bag cover and membrane horn switch assembly which permits servicing and removal of the membrane horn switch without damage or replacement of any other components of the assembly. Advantageously, the membrane horn switch may be serviced and replaced without removal of the backing plate from the cover. Also advantageously, the membrane horn switch may be removed and replaced easily by manual slip-fitted insertion and removal. Additionally, the size of the membrane horn switch may be reduced over those of the prior art, while permitting a larger size of horn-blowing area on the cover.

These advantages are preferably accomplished in the present invention by providing an air bag module and membrane horn switch assembly including an air bag cover, a membrane horn switch, a backing plate fixedly mounted on the cover in spaced relation to the cover, and a switch containment portion disposed on the backing plate. The switch containment portion releasably captures the membrane horn switch within the switch containment portion such that the membrane horn switch is normally positioned in spaced relation to the cover and such that the membrane horn switch is activated by downward movement of the cover towards the membrane horn switch. In addition, the switch containment portion also permits release and removal of the membrane horn switch from the switch containment portion while the backing plate remains fixed to the cover. Advantageously, the membrane horn switch can be removed and replaced while the cover and the backing plate remain stationary and undamaged. Preferably, the switch containment portion is integrally molded with the backing plate.

In accordance with other preferred aspects of the invention, the switch containment portion includes a frame portion projecting outwardly from the backing plate. The frame portion includes opposing side edges and an alignment edge extending between the side edges. The side edges and alignment edge guide and position the membrane horn switch within the frame portion. The side edges and alignment edge each including inwardly facing surfaces for laterally engaging the membrane horn switch to releasably capture the membrane horn switch in the frame portion. Preferably, the frame portion includes an edge opening generally opposite the alignment edge. The edge opening is sized for permitting lateral insertion and removal of the membrane horn switch therethrough without movement of the backing plate. Also preferably, the cover includes tapered cover ramps positioned generally above the edge opening and the switch containment portion includes switch ramp portions positioned generally within the edge opening. The cover ramps and the switch ramp portions cooperatively guide the membrane horn switch into the frame portion upon lateral insertion of the membrane horn switch through edge opening.

In accordance with additional preferred aspects of the invention, the membrane horn switch includes a leading edge having an outwardly extending tab portion thereon. The alignment edge of the frame portion includes a tab aperture therein and the tab portion is seated in the tab aperture to align and position the membrane horn switch in the frame portion. Also preferably, the cover includes a raised portion aligned above the membrane horn switch when the membrane horn switch is seated in the frame portion. The raised portion concentrates the load when the cover is pressed to activate the membrane horn switch. Preferably, the raised portion is a continuous circular ring.

BRIEF DESCRIPTION OF THE DRAWINGS

The present invention is described below, by way of example only, with reference to the accompanying drawings in which.

DESCRIPTION OF THE PREFERRED EMBODIMENT

Figure 1:
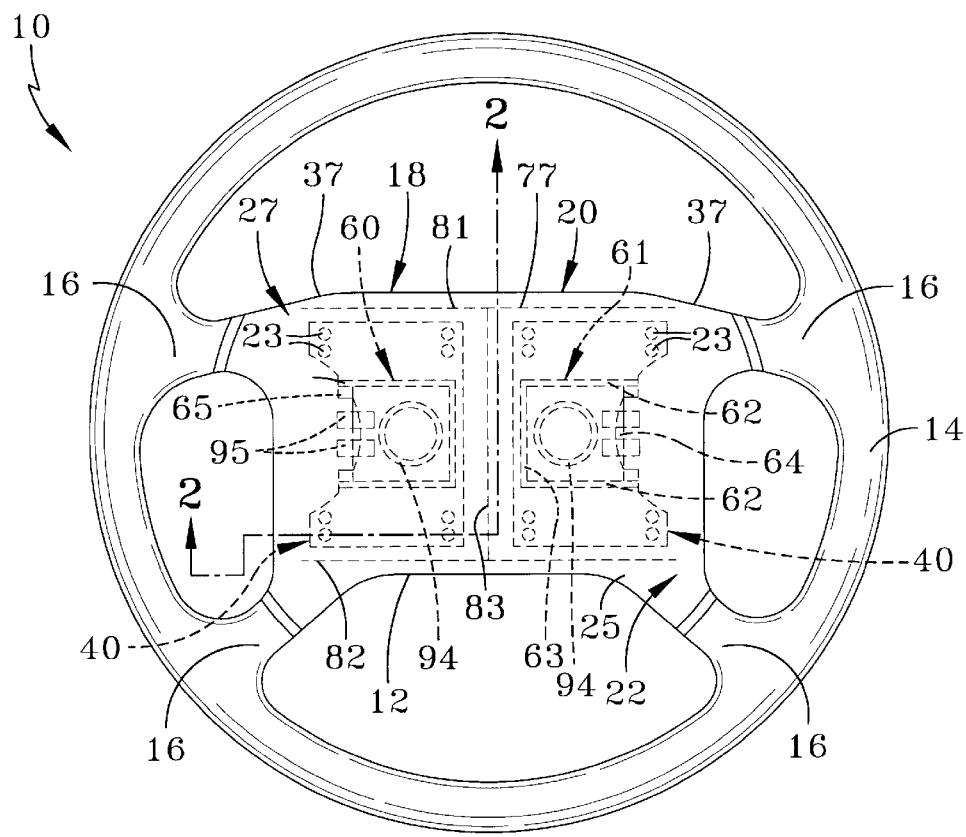
FIG. 1 is a plan view of a steering wheel and an air bag cover and membrane horn switch assembly and showing a backing plate, cover ramps, mounting posts and a raised ring in phantom.

Referring to FIG. 1, a vehicle steering wheel 10 includes a central hub portion 12, a generally circular outer rim portion 14, and a plurality of spokes 16 extending between the hub portion 12 and the rim portion 14. An air bag module 18 is mounted on the hub portion 12 of the steering wheel 10. The air bag module 18 includes an air bag (not shown) and an inflator (not shown) for generating gas to inflate the air bag. The air bag module 18 also includes an air bag cover and membrane horn switch assembly, generally designated as 20. The air bag cover and membrane horn switch assembly 20 includes a cover 22, a membrane horn switch 30, a backing plate 40, and a switch containment portion 60, as described in detail hereinafter.

Figure 2:
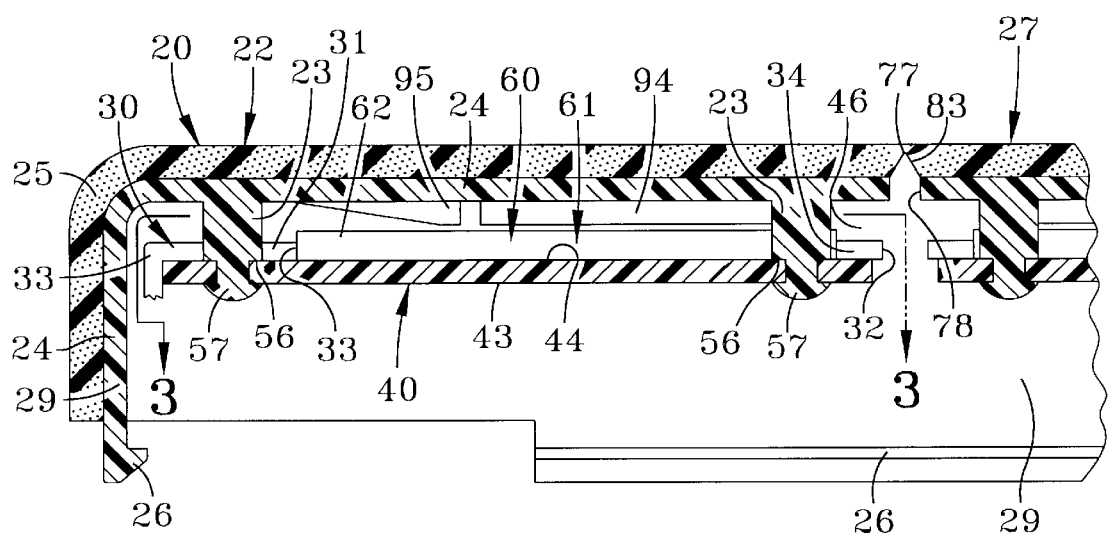
FIG. 2 is a sectional view taken along line 2—2 of FIG. 1.

As best shown in FIG. 2, the cover 22 includes an inner layer 24 preferably being a resilient plastic material, such as a thermoplastic material. The cover 22 preferably also includes a decorative outer layer 25 being a soft urethane foam which overlays the plastic material of the inner layer 24 for decorative purposes. The inner layer 24 and outer layer 25 cooperatively form the cover 22 and may be handled as a single component during assembly. However, it will be appreciated that the decorative outer layer 25 may be eliminated. The cover 22 may be made of any materials which are sufficiently flexible and resilient such that they can be manually compressed to activate the membrane horn switch 30, as described further hereinafter. The cover 22 is preferably generally cup-shaped for housing the air bag and inflator therein. The cover 22 includes a generally planar upper cover portion 27 and downwardly extending side cover flanges 29. The inner layer 24 of the side cover flanges 29 of the cover 22 preferably includes downwardly extending hooks 26 spaced around the perimeter for attaching the air bag cover and membrane horn switch assembly 20 to a base (not shown) of the air bag module 18.

The upper cover portion 27 generally includes two opposing halves 37 which are mirror images of each other. Each of the halves 37 of the upper cover portion 27 preferably includes a raised ring 94 for load concentration. The raised rings 94 are each generally centered on each of the halves 37 and centered over each of the membrane horn switches 30. The raised rings 94 are each preferably a continuous circle which extend downwardly from the inner layer 24 towards the backing plate 40. The raised rings 94 are preferably integrally molded with the inner layer 24 of the cover 22. When downward pressure is applied anywhere on the upper cover portion 27, the movement is transferred to the raised rings 94 which concentrates the load from the movement onto the underlying membrane horn switches 30, as described further hereinafter.

As shown in FIGS. 1–5, each of the halves 37 of the cover 22 preferably includes a pair of cover ramps 95 having inclined surfaces rising away from the cover 22. The cover ramps 95 assist in guiding insertion of the membrane horn switches 30 into the switch containment portions 60 of the backing plates 40, as described further hereinafter. It will be appreciated that while two cover ramps 95 are preferably shown on each half 37 of the upper cover portion 27, it will be appreciated that there could be one cover ramp 95 on each half 37 or more than two cover ramps 95 on each half 37.

Figure 5:
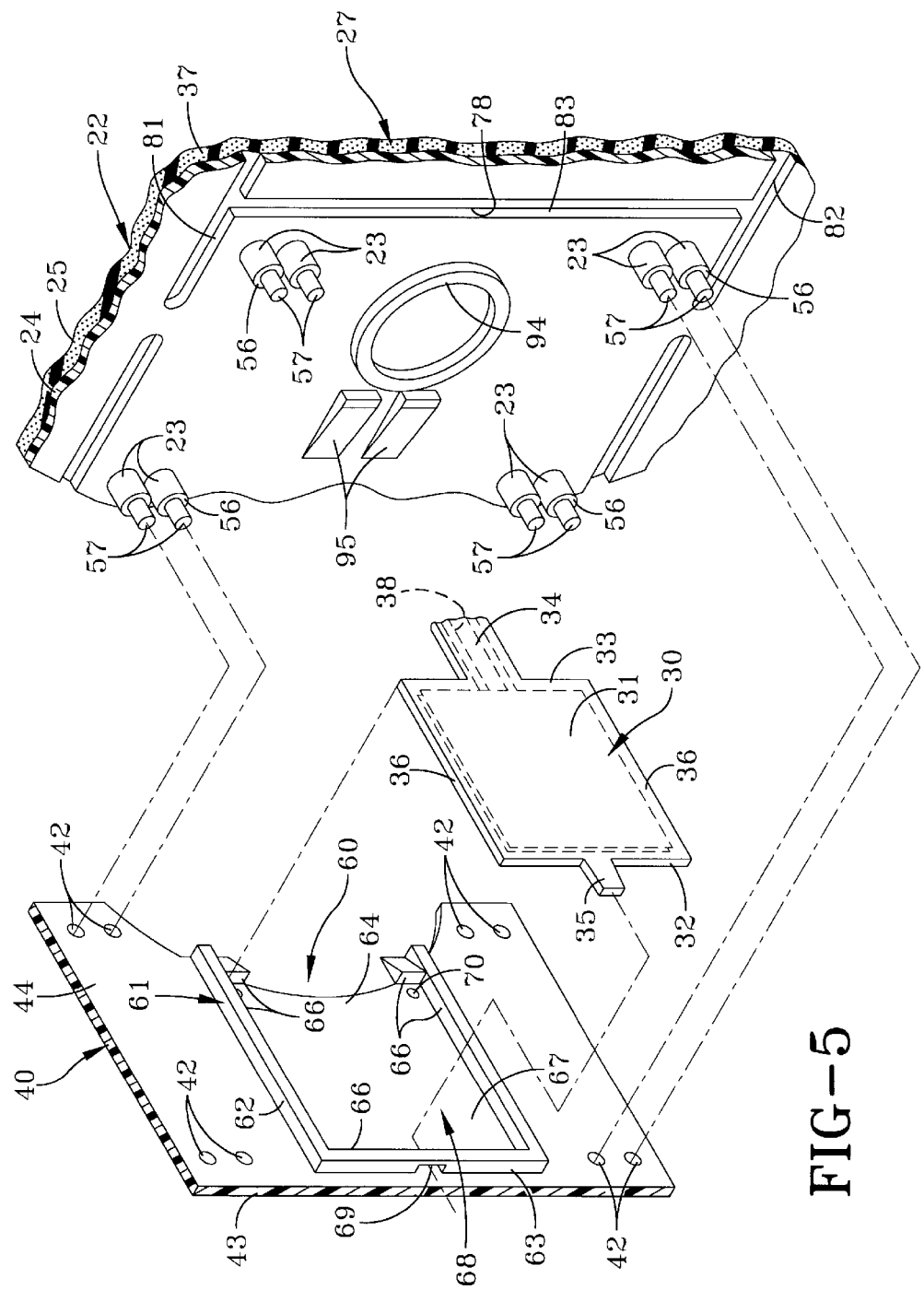
FIG. 5 is an exploded perspective view of the air bag cover and membrane horn switch assembly with the cover partially broken away.

As best shown in FIGS. 1, 2 and 5, the inner layer 24 of the cover 22 further includes a plurality of outwardly projecting mounting posts 23 spaced apart around the halves 37 of the upper cover portion 27 and extending generally downward towards the backing plate 40. The outwardly projecting mounting posts 23 are preferably integrally molded with the inner layer 24 of the cover 22. It will be appreciated that the mounting posts 23 may vary in size and number depending on the desired strength to hold the backing plate 40 onto the inner layer 24 during air bag deployment, as described further hereinafter. As best shown in FIG. 1, the preferred embodiment includes four sets of two mounting posts 23 each on both halves 37 of the cover 22. The mounting posts 23 are generally aligned for engagement with the corners of the backing plates 40.

As best shown in FIGS. 2 and 5, the mounting posts 23 each include a radially outwardly projecting shoulder portion 56 thereon. The shoulder portions 56 each engage the backing plate 40 when the backing plate 40 is mounted to the cover 22. The shoulder portions 56 each have a height for maintaining the backing plate 40 in spaced relation with the inner layer 24 of the cover 22, as described further hereinafter. Lower free ends 57 of the mounting posts 23 are preferably each deformed, such as by heat staking, for fixedly mounting the backing plate 40 to the cover 22.

As best shown in FIGS. 1, 2 and 5, the outer layer 25 preferably includes superficial grooves 77 in an "I"-shaped pattern and underlying slots on the inner layer 24, such as a central slot 78, which cooperatively provide weakened tear seams 81, 82, 83 along which the cover 22 is forcibly opened by deployment of the air bag upon discharge of gas by the inflator. The tear seams 81, 82, 83 include the upper tear seam 81, the lower tear seam 82, and the central tear seam 83 cooperatively providing the "I"-shaped tear pattern on the upper cover portion 27 of the cover 22.

As best shown in FIG. 1, the air bag cover and membrane horn switch assembly 20 includes a pair of membrane horn switches 30 removably mounted on the backing plate 40 and normally spaced beneath the upper cover portion 27 of the cover 22, as described in detail below. The membrane horn switches 30 are each preferably located on opposing sides of the central tear seam 83. The membrane horn switches 30 each include a main body portion 31 which has a generally rectangular shape. The main body portions 31 of the membrane horn switches each have a leading edge 32, an opposite back edge 33, and side edges 36 extending between the leading and back edges 32, 33.

Figure 3:
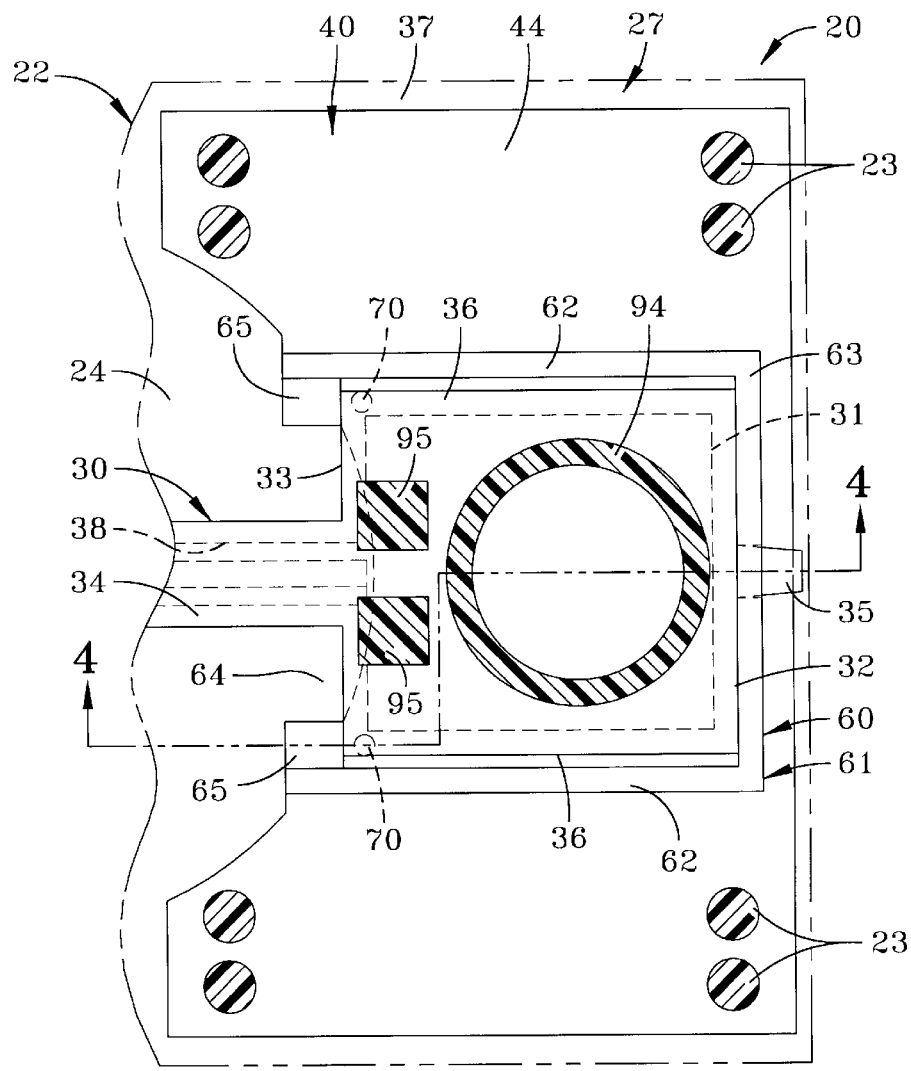
FIG. 3 is a view taken along line 3—3 of FIG. 2 and showing a plan view of the air bag cover and membrane horn switch assembly.
Figure 4:
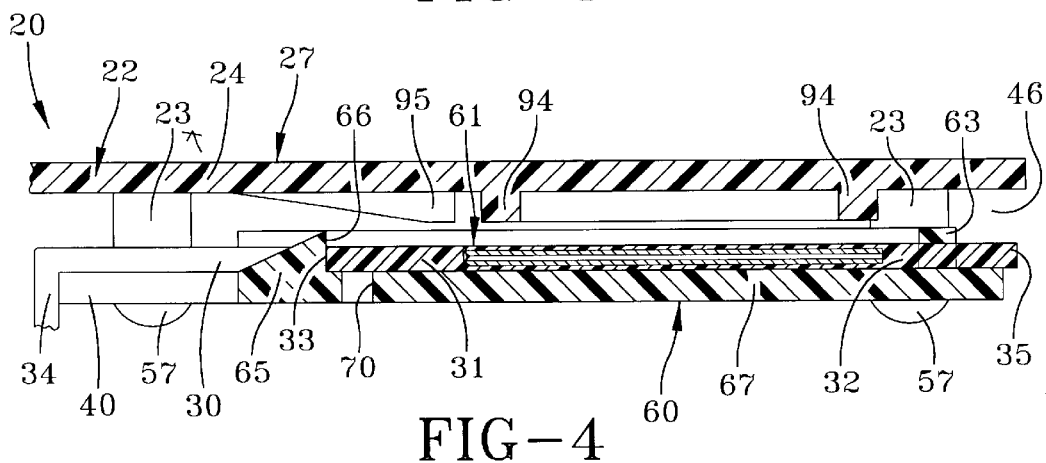
FIG. 4 is a sectional view taken along line 4—4 of FIG. 3 and showing the switch partially-broken-away.

As shown in FIGS. 3–5, the membrane horn switches 30 each include a tab portion 35 extending outward from generally the center of the leading edge 32 of the membrane horn switches 30. During assembly, the tab portions 35 position and align the membrane horn switches 30 in the switch containment portions 60 of the backing plates 40, as described further hereinafter. The membrane horn switches 30 each further include a tail portion 34 extending from the back edges 33 and to which electrical wires 38 are connected as best shown in FIGS. 3 and 5. The very thin membrane horn switches 30 may be of any conventional construction and are shown schematically as a plastic material comprised of layers as best shown in FIG. 4. The membrane horn switches 30 may be comprised of two thin sheets having conductive coatings thereon separated by thin spacers. Upon the application of pressure to the membrane horn switches 30, the conductive surfaces are brought together to close a circuit and actuate a horn (not shown). The membrane horn switches 30 are very thin, preferably being less than a millimeter in thickness. The membrane horn switches 30 are shown somewhat thicker in the drawings for clarity.

It will be appreciated that the main body portions 31 of the membrane horn switches 30 are substantially smaller than the overlying planar upper cover portion 27. For example, the main body portions 31 are approximately half the size of the upper cover portion 27 and are generally centered beneath each half 37 of the upper cover portion 27 of the cover 22. Advantageously, the membrane horn switches 30 can be activated from pressure applied anywhere on the upper cover portion 27 as enabled by the opposing halves 37 of the upper cover portion 27 including the raised rings 94 above which the membrane horn switches 30 are centered. Thus, when pressure is applied on the upper cover portion 27 such that it is moved in a downwardly direction, the movement is translated to at least one of the raised rings 94 which presses against the respective membrane horn switch 30 backed by the rigid backing plate 40 for activation. Also advantageously, since the membrane horn switches 30 are smaller than those of the prior art, the cost of assembly is reduced. Also advantageously, since the smaller membrane horn switches 30 are centrally located on the upper cover portion 27 and since the membrane horn switches 30 are mounted on the switch containment portions 60 of the backing plates 40 independent of the cover 22, the upper cover portion 27 may have a visually pleasing outward curvature without detrimentally affecting the assembly or activation of the membrane horn switches 30.

It will be appreciated that the air bag cover and membrane horn switch assembly 20 is preferably mirrored about the central tear seam 83, such that a further detailed description of the components will be given with respect to one half of the air bag cover and membrane horn switch assembly 20.

Referring to FIGS. 1–5, the air bag cover and membrane horn switch assembly 20 further includes the backing plate 40 for capturing and releasing the membrane horn switch 30. The backing plate 40 is preferably made of a plastic material being sufficiently stiff to serve as a reaction surface when pressure is applied to the membrane horn switch 30. The backing plate 40 preferably has a generally rectangular shape and is sized larger than the membrane horn switch 30. The backing plate 40 includes a bottom side 43 for facing away from the cover 22 and a upper side 44 for facing towards the cover 22 when mounted thereon.

The backing plate 40 preferably includes a switch containment portion 60, located on the upper side 44, which releasably holds the membrane horn switch 30 in spaced relation to the cover 22. The switch containment portion 60 preferably includes a frame portion 61 raised upwardly from the upper side 44 of the backing plate 40 and preferably integrally molded with the backing plate 40. The frame portion 61 includes opposing side edges 62 and an alignment edge 63, each projecting upwardly from the upper side 44 of the backing plate 40. The alignment edge 63 generally extends between the side edges 62 and is used for stopping and positioning the membrane horn switch 30 upon insertion into the frame portion 61 as well as holding the membrane horn switch 30 in the switch containment portion 60.

As best shown in FIGS. 3 and 5, the side edges 62 and the alignment edge 63 cooperatively form three sides of a generally rectangular shape to complement the generally rectangular shape of the membrane horn switch 30. However, it will be appreciated that the frame portion 61 could be any shape which generally complements the shape of the membrane horn switch 30, which closely surrounds the membrane horn switch 30, and which has a shape that permits easy insertion of the membrane horn switch 30 therein. Thus, the edges 62, 63 may have unequal length and may be curved or straight. It will further be appreciated that the overall length or width of the frame portion 61 may preferably be slightly smaller than the membrane horn switch 30 such that the frame portion 61 holds the membrane horn switch 30 by restraint of the back, leading or side edges 33, 32, 36 by a slight interference fit therewith, as described further hereinafter.

The frame portion 61 includes an edge opening 64 located generally opposite the alignment edge 63 of the frame portion 61. The edge opening 64 permits insertion of the membrane horn switch 30 within the frame portion 61. Preferably, the switch containment portion 60 includes a pair of switch ramp portions 65 located on the edge opening 64 which are tapered for guiding the membrane horn switch 30 into the frame portion 61 during assembly, as described further hereinafter. The side edges 63 and alignment edge 64 of the frame portion 61 and the switch ramp portions 65 each have inwardly facing surfaces 66 which are positioned for engaging the membrane horn switch 30 therebetween preferably by a slight interference fit therewith for restraining the membrane horn switch 30 within the switch containment portion 60.

The switch containment portion 60 further includes a reaction surface 67 against which the membrane horn switch 30 is positioned in the assembled condition. The reaction surface 67 is sized approximately the same as or slightly less than the membrane horn switch 30 and also forms part of the upper side 44 of the backing plate 40. The frame portion 61 generally surrounds the reaction surface 67. The inwardly facing surfaces 66 of the side edges 62, alignment edge 63 and switch ramp portions 65 together with the reaction surface 67 cooperatively define a switch containment compartment 68 into which the membrane horn switch 30 is removably inserted during assembly. The reaction surface 67 preferably includes a pair of release apertures 70 positioned adjacent the switch ramp portions 65. To assist in removal of the membrane horn switch 30 from the switch containment portion 60, a small tool such as a pin may be used to push the back edge 33 of the membrane horn switch 30 away from the reaction surface 67 for subsequent lateral removal.

The alignment edge 63 of the frame portion 61 preferably includes a tab aperture 69 in which the tab portion 35 of the membrane horn switch 30 is seated during assembly for alignment of the membrane horn switch 30 within the switch containment portion 60, as described further hereinafter. The tab aperture 69 is preferably located on the alignment edge 63 at a location directly adjacent the reaction surface 67 such that the membrane horn switch 30 is positioned against the reaction surface 67 during assembly. The tab aperture 69 is sized for closely receiving the tab portion 35 therein such that the tab portion 35 may be slip-fittedly inserted into the tab aperture 69. It will also be appreciated that the edge opening 64 of the frame portion 61 is sized large enough such that the tail portion 34 of the membrane horn switch 30 is free to extend out through the backing plate 40 for connection to an electrical source in the assembled condition. The tail portion 34 also preferably serves as a handle for manual removal and insertion of the membrane horn switch 30 into the switch containment portion 60, as described below. The backing plate 40 preferably includes a plurality of post apertures 42 aligned for receiving the mounting posts 23 of the cover 22 therethrough, as described below.

The air bag cover and membrane horn switch assembly 20 is preferably assembled as follows with reference to FIG. 5. First, the post apertures 42 on the backing plate 40 are matably aligned with the mounting posts 23 on the inner layer 24 of the cover 22 which are in an undeformed condition. The mounting posts 23 are then inserted through the post apertures 42 such that the backing plate 40 is seated on the shoulder portions 56 of the mounting posts 23 which limits insertion and establishes the offset or gap 46 between the backing plate 40 and the cover 22, as best shown in FIG. 4. Then, the backing plate 40 is fixedly mounted to the mounting posts 23 preferably by deformation of the free ends 57 of the mounting posts 23, such as by heat staking or other bonding as best shown in FIG. 2. It will be appreciated that the backing plate 40 is fixedly mounted to the cover 22 and cannot be removed without damage to the cover 22 or backing plate 40. Advantageously, the backing plate 40 is securely anchored to the cover 22 for air bag deployment.

It will be appreciated that the backing plate 40 is mounted in spaced relation to the inner layer 24 of the upper cover portion 27. The upper side 44 of the backing plate 40 is preferably offset from the cover 20 by the gap 46 of about 3–5 mm such that the frame portion 61 is also preferably in spaced relation to the cover 22 when the backing plate 40 is attached to the cover 22. Advantageously, the vertical offset can be easily controlled by the controlling the height of the shoulder portions 56 of the mounting posts 23. As best shown in FIGS. 1, 3 and 4, when the backing plate 40 is mounted to the cover 22, the raised ring 94 is generally centered over the switch containment portion 60 and is also spaced apart from the upper side 44 of the backing plate 40.

When the backing plate 40 is fixedly mounted to the cover 22, the membrane horn switch 30 may be easily manually assembled within the switch containment portion 60 to complete the air bag module and membrane horn switch assembly 20 without the use of tools. With reference to FIGS. 3–5, the membrane horn switch 30 is manually held by the tail portion 34 which serves as a handle during the assembly process. The leading edge 32 with the tab portion 35 is centered in the edge opening 64 of the frame portion 61. During insertion, the membrane horn switch 30 is placed between the cover ramps 95 on the cover 22 and the switch ramp portions 65 of the switch containment portion 60 of the backing plate 40, which cooperatively guide the membrane horn switch 30 into the frame portion 61. The membrane horn switch 30 is further inserted into the frame portion 61 and is guided by the side edges 62 of the frame portion 61 for centering. In addition, the cover ramp portion 95 on the cover 22 guides the membrane horn switch 30 over the raised ring 94. Upon complete insertion as best shown in FIG. 3, the leading edge 32 abuts against the alignment edge 63 of the frame portion 61 and the tab portion 35 is seated in the tab aperture 69 to position the membrane horn switch 30 within the frame portion 61 and to hold the membrane horn switch 30 against the reaction surface 67 of the switch containment portion 60. In addition, the back edge 33 of the membrane horn switch 30 rides over the switch ramp portions 65 and is pressed against the inner surface 66 of the switch ramp portions 65. The membrane horn switch 30 is laterally restrained and held in the switch containment portion 60 by interaction with the inwardly facing surfaces 66 of the switch ramp portions 65, the alignment edge 63 and optionally the side edges 62 of the frame portion 61. Thus, the frame portion 61 is sized for closely receiving the membrane horn switch 60 therein and holds the membrane horn switch 30 therein by a slight interference fit and also by engagement of the tab portion 35 in the tab aperture 69.

The above assembly of the membrane horn switch 30 to the air bag module and membrane horn switch assembly 20, was described for the situation in which the backing plate 40 was already fixedly attached to the cover 22. This situation may be during initial assembly or during replacement or servicing of a membrane horn switch 30 which was previously removed, as described below. It will be appreciated that during initial assembly of the backing plate 40 to the cover 22, the membrane horn switch 30 could alternately be seated within the switch containment portion 60 either before or after attachment of the backing plate 40 to the cover 22.

The membrane horn switch 30 may easily be removed from the air bag cover and membrane horn switch assembly 20 as follows. The tail portion 34 of the membrane horn switch 30 may be manually held and pushed slightly in a direction towards the cover 22 to release the back edge 33 of the membrane horn switch 30 from lateral engagement with the inwardly facing surfaces 66 of the switch ramp portions 65. Then, the membrane horn switch 30 with the back edge 33 leading is simply laterally pulled out of the frame portion 61 through the edge opening 64. In addition, the tab portion 35 is simultaneously simply pulled out of the tab aperture 69.

Thus, it will be appreciated that the membrane horn switch 30 can easily be manually inserted and removed from the switch containment portion 60 of the backing plate 40. If a problem is detected with the membrane horn switch 30, the membrane horn switch 30 can be serviced or replaced simply by removing and inserting as described above with the backing plate 40 remaining fixedly attached to the cover 22. Advantageously, the membrane horn switch 30 can be serviced or replaced without any movement or damage to the cover 40 or the backing plate 40. This serviceability is especially useful in the assembly plant prior to attachment of the cover 22 to the base of the air bag module since the membrane horn switch 30 can be replaced without scrapping the entire backing plate 40 and cover 22. This arrangement may also be useful even after the air bag module is assembled since the membrane horn switch 30 can be removed and replaced or serviced simply by removing the cover 22 from the air bag module. Since the switch containment portion 60 is preferably integrally molded with the backing plate 40, this serviceable feature can be added with minimal costs to the air bag module.

The air bag module and membrane horn switch assembly 20 functions as follows. As best shown in FIG. 4, it will be appreciated that in the assembled condition, the membrane horn switch 30 is preferably located against the reaction surface 67 of the switch containment portion 60. It will further be appreciated that the membrane horn switch 30 is normally vertically spaced apart from the raised ring 94 on the inner layer 24 of the cover 22. Thus, no pressure is applied to the membrane horn switch 30 and it normally remains inactive. However, the horn is easily actuated by downwardly pressing on upper cover portion 27 which in turn moves the raised ring 94 which in turn applies pressure to the membrane horn switch 30 to close the circuit and actuate the horn. The reaction surface 67 of the switch containment portion 60 is sufficiently stiff to serve as a reaction surface against which the membrane horn switch 30 may be compressed for actuation of the horn. Advantageously, the size of the membrane horn switch 30 is reduced by the use of the raised ring 94 which is centered over the membrane horn switch 30. Pressing anywhere on the upper cover portion 27 even if not directly above the membrane horn switch 30, sufficiently moves the raised ring 94 to activate the membrane horn switch 30.

Upon air bag deployment, the deploying air bag breaks open the cover 22 along the "I"-shaped tear seams 81, 82, 83. The cover 22 opens and each of the membrane horn switches 30 and backing plates 40 remain attached to their respective halves 37 of the cover 22 during air bag inflation as enabled by the mounting posts 23.

It will be understood that a person skilled in the art may make modifications to the embodiments shown herein within the scope and intent of the claims. For example, although preferred embodiment shows a pair of membrane horn switches 30, one or more than two membrane horn switches 30 could be seated in a corresponding number of switch containment portions 60 with a respective number of backing plates 40 and corresponding raised rings 94. For example, it will be appreciated that a single membrane horn switch 30 having a central weakened tear seam could be used in which case the switch containment portion 60 could extend across one or two backing plates 40 mounted on the cover 22. Although the backing plates 40 are shown preferably connected to the substrate layer 24 by heat staking, other conventional methods of fastening are also possible.

While the present invention has been described as carried out in a specific embodiment thereof, it is not intended to be limited thereby but is intended to cover the invention broadly within the scope and spirit of the appended claims.

What is claimed is:

1. An air bag module and membrane horn switch assembly comprising:

an air bag cover;

a membrane horn switch;

a backing plate fixedly mounted on the cover in spaced relation to the cover; and a switch containment portion disposed on the backing plate, the switch containment portion including means for capturing the membrane horn switch within the switch containment portion such that the membrane horn switch is normally positioned in spaced relation to the cover and such that the membrane horn switch is activated by downward movement of the cover towards the membrane horn switch, and the switch containment portion including means for release and removal of the membrane horn switch from the switch containment portion while the backing plate remains fixed to the cover;

whereby the membrane horn switch can be removed and replaced while the cover and the backing plate remain stationary and undamaged.

2. An air bag module and membrane horn switch assembly comprising:

an air bag cover;

a membrane horn switch;

a backing plate fixedly mounted on the cover in spaced relation to the cover; and a switch containment portion disposed on the backing plate for releasably capturing the membrane horn switch therein;

whereby the membrane horn switch can be removed and replaced while the cover and the backing plate remain stationary and undamaged.

3. The assembly of claim 2 wherein the switch containment portion includes a frame portion projecting outwardly from the backing plate, the frame portion including opposing side edges and an alignment edge extending between the side edges, the side edges and alignment edge for guiding and positioning the membrane horn switch within the frame portion.

4. The assembly of claim 3 wherein the frame portion includes an edge opening generally opposite the alignment edge, the edge opening being sized for permitting lateral insertion and removal of the membrane horn switch therethrough.

5. The assembly of claim 4 wherein the switch containment portion includes a switch ramp portion positioned generally within the edge opening and wherein the switch ramp portion and alignment edge have inwardly facing surfaces which engage the membrane horn switch and cooperatively capture the membrane horn switch between the switch ramp portion and the alignment edge of the frame.

6. The assembly of claim 4 wherein the membrane horn switch includes a tail portion including wires for connection to activate the membrane horn switch when compressed and wherein the tail portion extends out through the edge opening when the membrane horn switch is captured in the frame portion of the switch containment portion.

7. The assembly of claim 2 wherein the backing plate includes an upper surface facing the cover and wherein the switch containment portion includes a plurality of inwardly facing surfaces projecting outwardly from the upper surface of the backing plate and wherein the inwardly facing surfaces form a frame portion sized for closely receiving the membrane horn switch therein and wherein the inwardly facing surfaces laterally engage the membrane horn switch for releasably capturing the membrane horn switch in the frame portion.

8. The assembly of claim 2 wherein the switch containment portion includes an edge opening through which the membrane horn switch can be laterally removed and inserted from the switch containment portion.

9. The assembly of claim 2 wherein the switch containment portion includes a frame portion having opposing side edges and an alignment edge, the side edges and alignment edges being positioned for closely receiving the membrane horn switch therebetween.

10. The assembly of claim 9 wherein the side edges and alignment edges of the frame portion each include inwardly facing surfaces laterally engaging the membrane horn switch when inserted in the frame portion to releasably capture the membrane horn switch.

11. The assembly of claim 10 wherein the frame portion includes an edge opening extending between the side edges, the edge opening being sized for receiving the membrane horn switch therethrough upon insertion and removal from the switch containment portion.

12. The assembly of claim 11 wherein the membrane horn switch includes a tail portion extending out through the edge opening when the membrane horn switch is seated in the switch containment portion.

13. The assembly of claim 11 wherein the switch containment portion includes at least one switch ramp portion positioned in the edge opening for guiding the membrane horn switch into the frame portion.

14. The assembly of claim 9 wherein the switch containment portion includes a reaction surface located between the edges of the frame portion, the reaction surface for backing the membrane horn switch when the cover is pressed to activate the membrane horn switch, the membrane horn switch being positioned against the reaction surface when seated in the frame portion.

15. The assembly of claim 14 wherein the reaction surface includes at least one release aperture vertically aligned with the membrane horn switch for assisting with release of the membrane horn switch from the frame portion.

16. The assembly of claim 14 wherein the cover includes a raised portion aligned above the membrane horn switch and the reaction surface when the membrane horn switch is seated in the frame portion, the raised portion for concentrating load when the cover is pressed to activate the membrane horn switch.

17. The assembly of claim 16 wherein the raised portion is a continuous circular ring.

18. The assembly of claim 2 wherein the cover includes at least one cover ramp extending towards the backing plate for guiding the membrane horn switch into the switch containment portion.

19. The assembly of claim 2 wherein the switch containment portion is integrally molded with the backing plate.

20. The assembly of claim 9 wherein the membrane horn switch includes a leading edge having an outwardly extending tab portion thereon and wherein the alignment edge of the switch containment portion includes a tab aperture therein and wherein the tab portion is seated in the tab aperture to align and position the membrane horn switch in the switch containment portion.

\* \* \* \* \*